United States Patent [19]
Shimizu

[11] Patent Number: 5,774,578
[45] Date of Patent: Jun. 30, 1998

[54] APPARATUS FOR AND METHOD OF UTILIZING DENSITY HISTOGRAMS FOR CORRECTING OBJECTIVE IMAGES

[75] Inventor: Shinji Shimizu, Kyoto, Japan

[73] Assignee: Dainippon Screen Mfg. Co., Ltd., Kyoto, Japan

[21] Appl. No.: 617,360

[22] Filed: Mar. 18, 1996

[30] Foreign Application Priority Data

Mar. 17, 1995 [JP] Japan ................................. 7-086269

[51] Int. Cl.$^6$ ........................ G06K 9/00; G06K 9/34
[52] U.S. Cl. .................... 382/170; 382/171; 382/282
[58] Field of Search .................... 382/176, 171, 382/261, 260, 254, 170, 168, 282; 358/462, 464, 448, 453, 538

[56] References Cited

U.S. PATENT DOCUMENTS

| | | | |
|---|---|---|---|
| 4,903,145 | 2/1990 | Funada | 358/461 |
| 5,191,443 | 3/1993 | Nagaoka | 358/453 |
| 5,200,840 | 4/1993 | Koike et al. | 358/453 |

FOREIGN PATENT DOCUMENTS 3019836  1/1982  Germany.

OTHER PUBLICATIONS

A. Hoyer et al., "Bildverbesserung durch digitale Nachverarbeitung", Philips techn. Rdsch., 38, pp. 311–323, 1979, Nr. 11/12.

*Primary Examiner*—Scott Rogers
*Attorney, Agent, or Firm*—Ostrolenk, Faber, Gerb & Soffen, LLP

[57] ABSTRACT

Even if various types of images exist together in an objective image, it is possible to sufficiently improve the quality of the image at all areas which are to be corrected. An image-correction apparatus has such a structure in which a CPU (10), an image-correction procedure part (12), a color monitor (14), a key board (16), a mouse (18), an inputting device (20), an image memory (22), an image-correction method memory (24), an outputting device (26) and the like are connected to a main bus (50). First, the CPU (10) instructs the inputting device (20) to read the objective image and store resultant data in the image memory (22), and instructs the color monitor (14) to display the objective image, using the image data which are stored. An operator then designate areas to be corrected, and selects a image-correction method which is suitable to the area from four types of image-correction methods, i.e., one for correcting a photograph, one for correcting a black letter against a white background, one for correcting a white letter against a black background and the other for correcting a thin line, while observing the screen display. The image-correction procedure part (12) executes the designated image-correction method on the designated area. The CPU (10) instructs the outputting device (26) to output an image which is expressed by image data which are obtained after execution of the image-correction procedure.

6 Claims, 11 Drawing Sheets

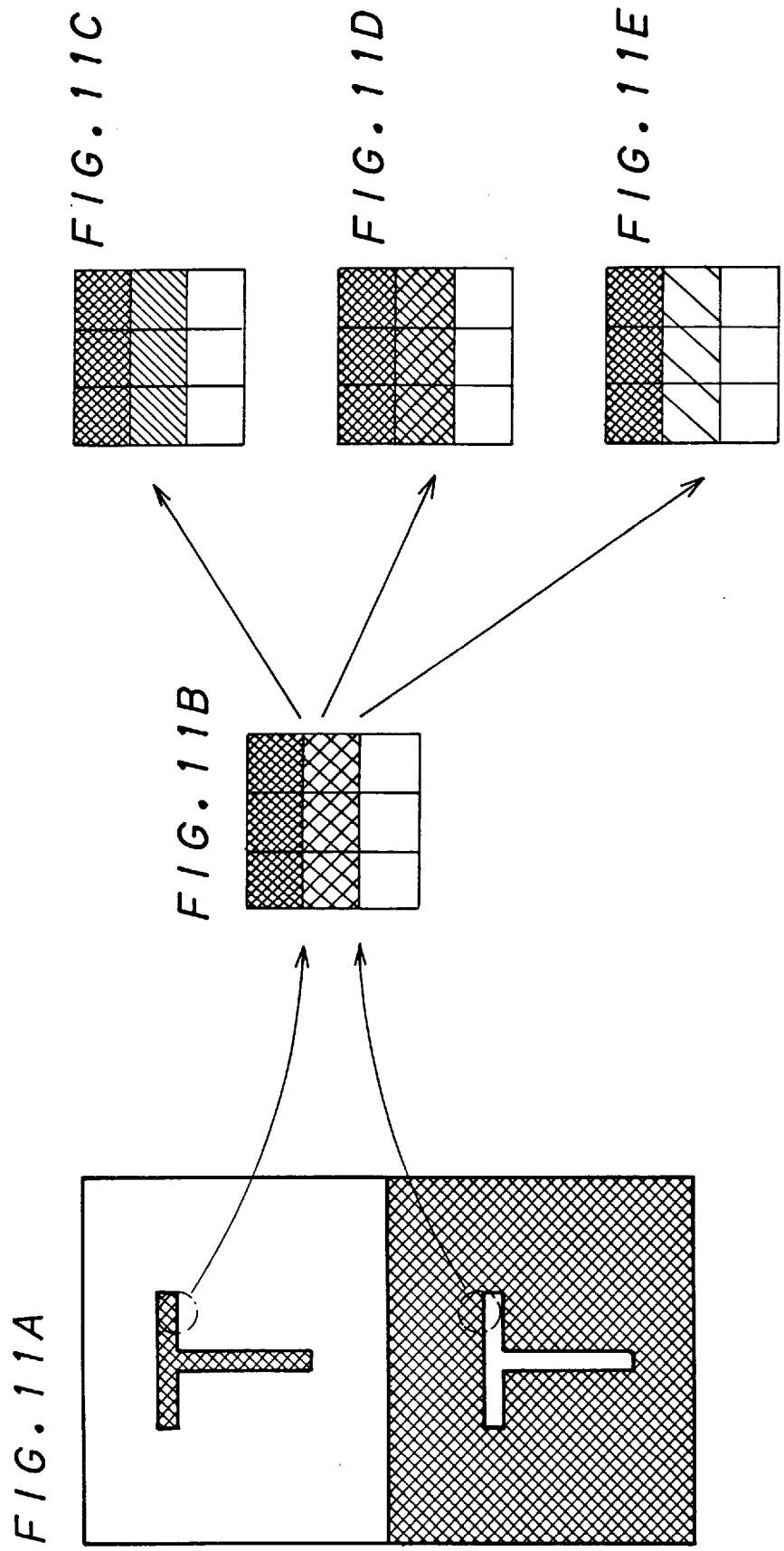

APPARATUS FOR AND METHOD OF UTILIZING DENSITY HISTOGRAMS FOR CORRECTING OBJECTIVE IMAGES

BACKGROUND OF THE INVENTION

1. Field of the Invention

The present invention relates to an image-correction apparatus and an image-correction method, in which an image is corrected by edge enhancement, smoothing or the like to thereby improve the quality of the image.

2. Description of the Background Art

A conventional image-correction apparatus for correcting an image by edge enhancement, smoothing or the like is as follows.

FIG. 7 is a structure diagram showing an example of a conventional image-correction apparatus (hereinafter "first conventional example"). The image-correction apparatus is constructed so that an image-correction procedure part 52, an inputting device 54, an outputting device 56 and a magnetic disk device 58 are connected to a main bus 50. Data are transmitted between the respective parts on the main bus 50. During correction of an image, the inputting device 54 reads an image to be corrected (hereinafter "objective image"), first, thereby creating digital image data. The image-correction procedure part 52 receives the image data through the main bus 50 and performs a predetermined image-correction procedure on the image data, whereby the objective image as a whole is corrected by edge enhancement, smoothing or the like. The image data as they are after corrected by the image-correction procedure (hereinafter "corrected image data") are transmitted to the outputting device 56, and the outputting device 56 outputs an image which is expressed by the corrected image data. The corrected image data are transmitted to the magnetic disk device 58 and stored therein, if necessary.

FIG. 8 is a structure diagram showing other example of a conventional image-correction apparatus (hereinafter "second conventional example"). The image-correction apparatus is constructed so that a CPU 60, an image-correction procedure part 62, a color monitor 64, a key board 66, a mouse 68, an inputting device 70, an image memory 72, an outputting device 76 a magnetic disk device 78 are connected to the main bus 50. Data are transmitted between the respective parts on the main bus 50. During correction of an image, as in the first conventional example, first, the inputting device 70 reads an image to be corrected, thereby creating digital image data. The CPU 60 stores the image data in the image memory 72, once, and thereafter displays an objective image on the color monitor 64 based on the image data which are stored in the image memory 72. While observing the displayed objective image on the color monitor 64, an operator manipulates the mouse 68 and the key board 66 so as to designate an area to be corrected in the objective image. The image-correction procedure part 62 performs a predetermined image-correction procedure on image data which correspond to the designated area of the image data which are stored in the image memory 72, whereby the designated area is corrected by edge enhancement, smoothing or the like. The CPU 60 transmits the image data as they are after corrected by the image-correction procedure to the outputting device 76, so that an image which is expressed by the corrected image data is outputted. The CPU 60 also transmits the corrected image data to the magnetic disk device 78 and stores the corrected image data in the magnetic disk device 78, in accordance with an instruction given through the key board 66 and the mouse 68.

Image-correction methods as follows are conventionally used in image-correction procedures which are performed in the first and the second conventional examples described above.

(1) First Image-Correction Method

In the first image-correction method, pixels contained in an objective image or an area to be corrected (hereinafter "objective area") of the objective image are noted. An n×n-pixel area including a noted pixel is assumed, and an average value E of densities of pixels which are included in this area is calculated. A difference between the average value E and the density value of the noted pixel is multiplied by a predetermined coefficient, and a calculated value is added to the density value of the noted pixel. A resultant value is used as a post-correction density value of the noted pixel. For example, assuming that the noted pixel is a pixel X which is an m-th pixel on a w-th line and that n=3 as shown in FIG. 9, the average value E of the densities of the n×n pixels is expressed as:

$$E = \{V_{(w-1,m-1)} + V_{(w-1,m)} + V_{(w-1,m+1)} + V_{(w,m-1)} + V_{(w,m)} + V_{(w,m+1)} + V_{(w+1,m-1)} + V_{(w+1,m)} + V_{(w+1,m+1)}\}/9 \quad (1)$$

where $V_{(i,j)}$: the density value of a j-th pixel in an i-th line. Hence, assuming that the predetermined coefficient is k, a post-correction density value $V_s$ of the noted pixel X is expressed as:

$$V_s = V_{(w,m)} + k \cdot \{V_{(w,m)} - E\} \quad (2)$$

If k>0 in Eq. (2) above, this image-correction method serves as processing of edge enhancement. If k<0 in Eq. (2) above, this image-correction method serves as processing of smoothing.

(2) Second Image-Correction Method

In the second image-correction method, the following procedures are performed, noting pixels contained in an objective area. First, a plurality of n×n edge detection filters are prepared which express weighing in a noted pixel and pixels around the noted pixel, and a weighted mean for the noted pixel and the surrounding pixels is obtained using these edge detection filters. Weighted means obtained using the respective edge detection filters are compared to each other, thereby judging a configuration of an edge, such as an edge direction around the noted pixel. Next, a plurality of correction filters for performing predetermined correction are prepared in accordance with various edge configurations. Of the plurality of the correction filters, one correction filter is selected based on a result of the judgement above. Using the selected correction filter, a weighted mean of the densities of the noted pixel and the surrounding pixels is yielded once again. The weighted mean value is used as a post-correction density value of the noted pixel. When the density values of all pixels which are included in the objective area are changed in this manner, this means that correction such as edge enhancement and smoothing is performed on the image of the objective area, in accordance with the plurality of the correction filters which are prepared in advance.

(3) Third Second Image-Correction Method

In the third image-correction method, a density value conversion table corresponding to predetermined correction is prepared in advance, the density values of pixels which are included in an objective area are converted using the density value conversion table, and converted values are used as post-correction density values. When the density values of all pixels which are included in the objective area are converted in this manner, this means that correction such as edge enhancement and smoothing is performed on the image of the objective area, in accordance with the density value conversion table. When the density values of all pixels which are included in the objective area are converted using a density value conversion table as that shown in FIG. 10, for instance, this means edge enhancement on the image of the objective area.

Images like a photograph (hereinafter "photographic images"), images like black letters against a white background (hereinafter "black images in white backgrounds"), images like white letters against a black background (hereinafter "white images in black backgrounds"), etc., are mixed in some images to be corrected (i.e., objective images). When such an objective image is to be corrected to improve the quality of the image, preferably, processing such as smoothing and edge enhancement is performed on a photographic image area, processing to enhance a black portion is performed on a black image in a white background, and processing to enhance a white portion is performed on a white image in a black background. In short, it is desirable to perform suitable correction depending on types of images.

However, the image-correction procedure performed in the first or the second conventional example is realized by a selected one of the first to the third image-correction methods which is adopted in accordance with a purpose, an application, etc. By performing the image-correction procedure, edge enhancement, smoothing or the like which corresponds to the adopted image-correction method is performed. Due to this, when different types of images exist together in an objective image as described earlier, while the image quality is largely improved in an image area which is suitable to the adopted image-correction method, the image quality remains almost unchanged in an image area which is not suitable to the adopted image-correction method.

Assuming that a black image in a white background and a white image in a black background exist together in an objective image as shown in FIG. 11A, 3×3 pixels within a dotted circle in an area of the black image in the white background, i.e., in an upper half area (hereinafter "first pixel group") correspond to a boundary portion between the white background and the black letter, whereas 3×3 pixels within a dotted circle in an area of the white image in the black background, i.e., in a lower half area (hereinafter "second pixel group") correspond to a boundary portion between the black background and the white letter. The first pixel group and the second pixel group have the same density distribution as that shown in FIG. 11B. It then follows that the first pixel group and the second pixel group have the same density distribution after corrected. For example, if the first image-correction method is adopted to correct an image and k>0 in Eq. (2), edge enhancement is performed on both the black image in the white background and the white image in the black background. As a result, of the 3×3 pixels shown in FIG. 11B, three pixels in the middle position in a vertical direction, namely, pixels having mid-tone densities between white and black (hereinafter "mid-tone pixel") have higher densities, changing the density distribution of the first pixel group and the second pixel group into a density distribution as that shown in FIG. 11C. Meanwhile, the first pixel group, i.e., a group of pixels expressing the black letter, is originally desired to be corrected so as to increase the densities of the mid-tone pixels as shown in FIG. 11D, and the second pixel group, i.e., a group of pixels expressing the white letter, is originally desired to be corrected so as to decrease the densities of the mid-tone pixels as shown in Fig. 11E. For this reason, while the image quality of the image area of the black letter is improved as a result of the image-correction, the image quality of the image area of the white letter is not improved. Rather, the image quality deteriorates.

Further, depending on a relationship between the contents of the objective image and the adopted image-correction method, in the respective areas of the objective image, the image quality is improved to a certain extent, but not to an expected level.

SUMMARY OF THE INVENTION

The present invention is directed to an apparatus for correcting an objective image. According to the present invention, the apparatus comprises: a) memory means for storing a plurality of image-correction procedures; b) display means for displaying the objective image; c) designation means for designating a part of the objective image on the display means to determine a partial image; d) selection means for selecting one of the plurality of image-correction procedures according to an image-type of the partial image, to thereby determine a selected image-correction procedure; and e) correction means for correcting the partial image in accordance with the selected image-correction procedure.

Image-correction procedure to be used to perform such image-correction each only have to improve the quality of an image of one corresponding image-type, rather than improving the quality of various types of images as in the conventional techniques.

In a preferred embodiment of the present invention, the selection means includes: d-1) first manual means for determining the image-type of the partial image through manual operation; and d-2) means for selecting the one of the plurality of image-correction procedures according to the image-type of the partial image.

Preferably, the means d-2) includes: d-2-1) second manual means for selecting the one of the plurality of image-correction procedures according to the image-type of the partial image through manual operation.

In another preferred embodiment of the present invention, the selection means includes: d-3) first automatic means for automatically determining the image-type of the partial image from a density distribution on the partial image; and d-4) second automatic means for automatically determining the one of the plurality of image-correction procedures according to the image-type of the partial image.

The present invention is also directed to a method of correcting an objective image.

Accordingly, it is an object of the present invention to provide for an image-correction apparatus and an image-correction method which sufficiently improve the quality of the image at all areas which are to be corrected even if various types of images exist together in the image to be corrected.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 11A to 11E are views showing various image-correction procedures corresponding to an objective image in which black images in white backgrounds and white images in black backgrounds exist together.

DESCRIPTION OF THE PREFERRED EMBODIMENTS

Hardware Structure in Preferred Embodiments

Figure 1:
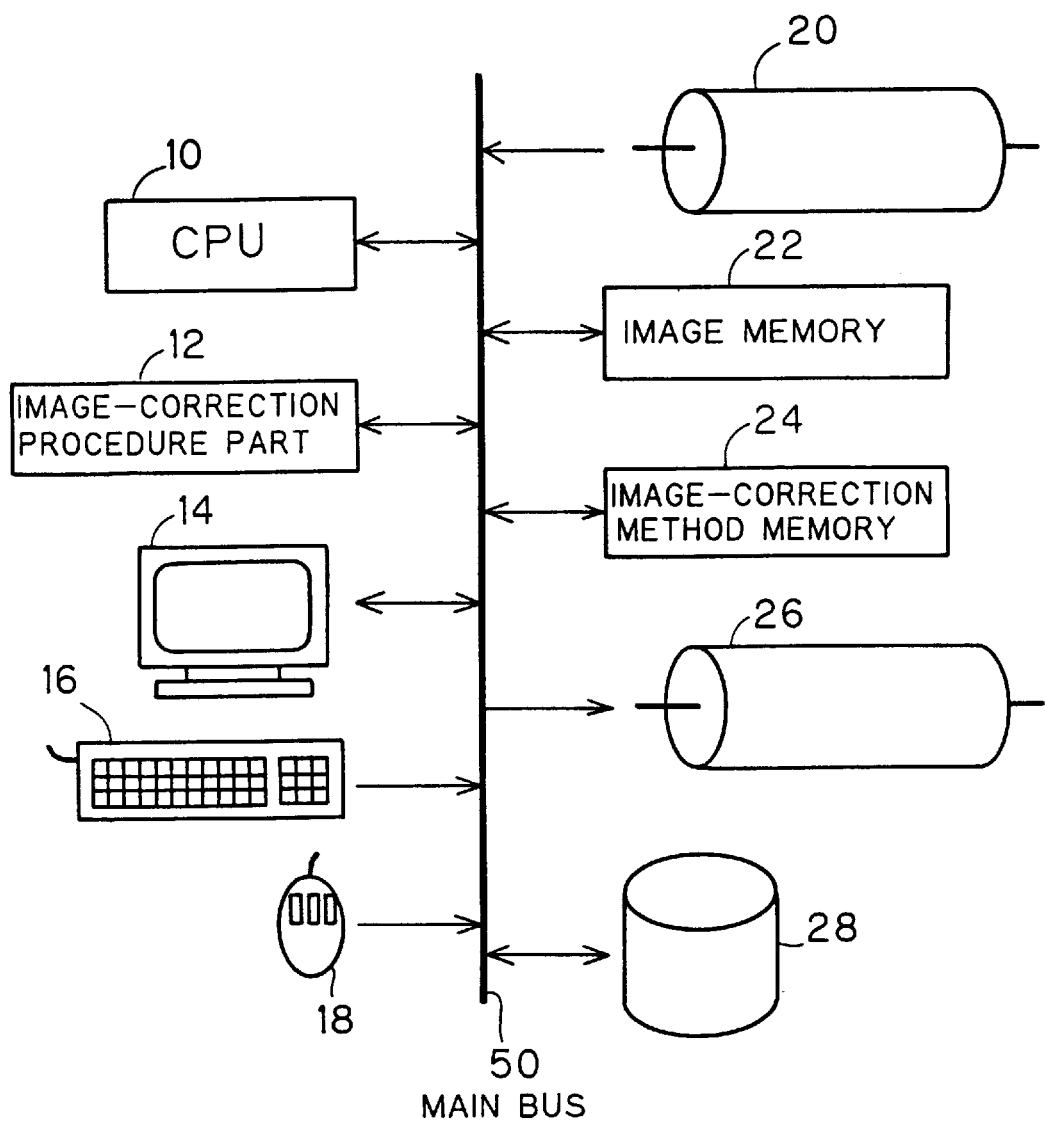
FIG. 1 is a view showing a hardware structure of an image-correction apparatus according to a preferred embodiment of the present invention (first preferred embodiment)

FIG. 1 shows a hardware structure of an image-correction apparatus according to a preferred embodiment of the present invention (first preferred embodiment). The image-correction apparatus is constructed such that a CPU 10, an image-correction procedure part 12, a color monitor 14, a key board 16, a mouse 18, an inputting device 20, an image memory 22, an image-correction method memory 24, an outputting device 26 a magnetic disk device 28 are connected to a main bus 50. Data are transmitted between the respective parts on the main bus 50.

In the structure above, the CPU 10 operates when the key board 16 and the mouse 18 are manipulated, controlling operations of the respective parts which are connected to the main bus 50 and data transfer between the respective parts.

The inputting device 20 reads an objective image and generates digital image data for each one of the colors, Y (yellow), M (magenta), C (cyan) and K (black). The image data are stored in the image memory 22.

The color monitor 14 displays the objective image based on the image data which are stored in the image memory 22, and also displays items which are necessary to operate the mouse 18.

The image-correction procedure part 12 performs an image-correction procedure on the image data which are stored in the image memory 22. Four types of image-correction methods are used in the present embodiment, i.e., one for a photograph, one for a black letter, one for a white letter and the other for a thin line. These image-correction procedures are stored in the image-correction method memory 24, as programs which are to be executed by the image-correction procedure part 12. The image-correction procedures for a photograph, a black letter, a white letter and a thin line are suitable to a photographic image, a black letter in a white background, a white letter in a black background and an image which is formed by a thin line (hereinafter "thin line image"), respectively. Specific examples will be described later.

The outputting device 26 is used to output a post-correction image which is expressed by the image data as they are after corrected by the image-correction procedure part 12. The magnetic disk device 28 is used to store corrected image data.

Sequence of Image-Correction Procedures

In the following, an image-correction procedure using the image-correction apparatus having a structure as above will be described. As herein described, an objective image is a color image.

Figure 2:
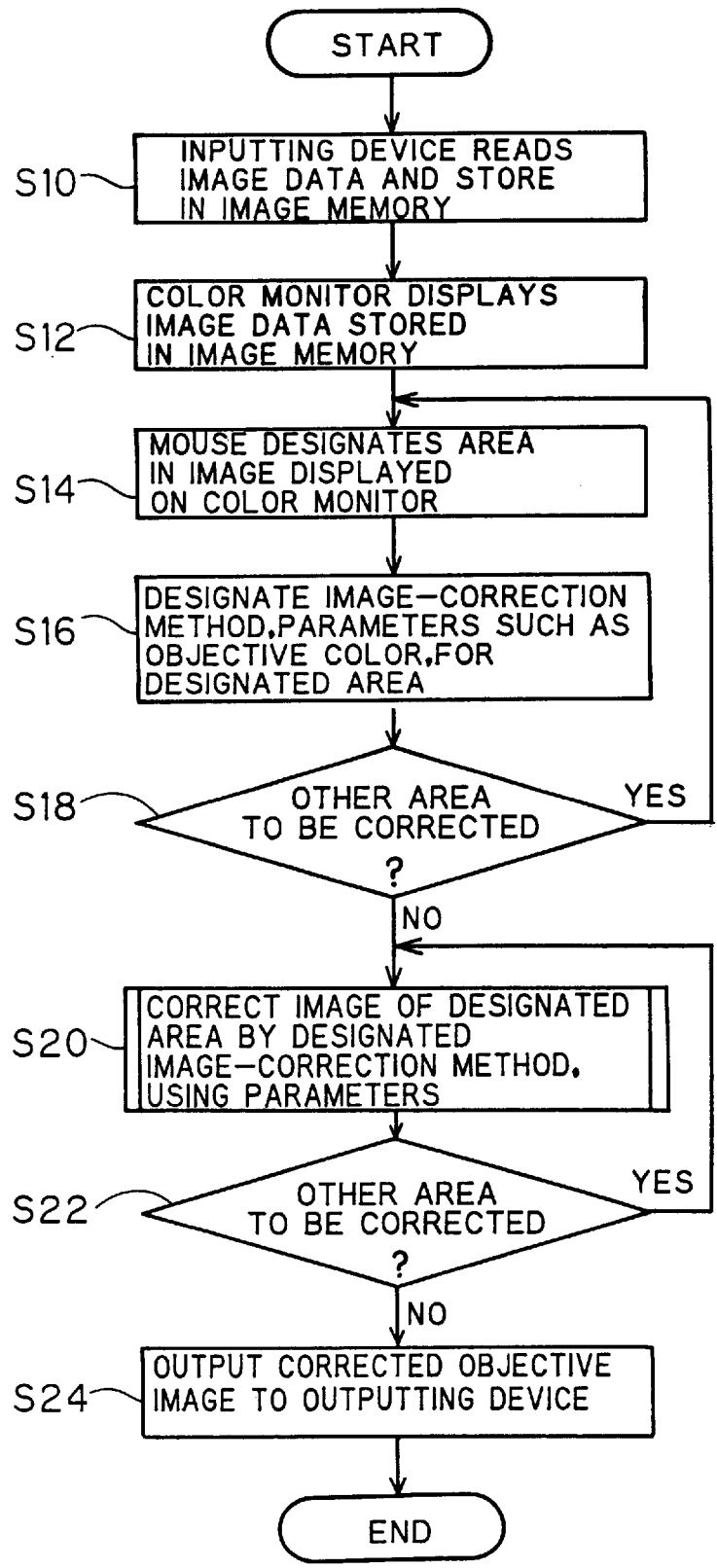
FIG. 2 is a flow chart showing a sequence of image-correction in the first preferred embodiment.

FIG. 2 is a flow chart showing a sequence of image-correction. During image-correction, first at Step S10, the CPU 10 causes the inputting device 20 to read an objective image and generate digital image data for each one of the colors Y, M, C and K, and the image data are stored in the image memory 22. Next, at Step S12, the CPU 10 causes the color monitor 14 to display the objective image based on the image data which are stored in the image memory 22.

When the color monitor 14 displays the objective image, at Step S14, an operator uses the mouse 18 and designates an area to be corrected in the objective image while observing the screen of the color monitor 14. At Step S16, using the key board 16 and the mouse 18, the operator designates the image-correction method to use for correction of the area which is designated (i.e., designated area) and parameters which are necessary for correction, such as a color to be corrected (i.e., either one of the colors Y, M, C and K) and a correction gain coefficient which indicates the degree of correction (hereinafter "correction parameters"). When designating the image-correction method at this step, the operator judges the type of the image, that is, whether the image is a photographic image, a black letter in a white background, a white letter in a black background or a thin line image, while observing the image of the designated area on the color monitor 14. Based on the judgement yielded at this step, the operator selects the image-correction method which is suitable to improve the image quality of the designated area from the four types of image-correction methods which are stored in the image-correction method memory 24 in advance, and designates the selected method. Although the present embodiment requires that the image-correction method is designated for the designated area, the type of the image of the designated area may be designated instead. In such a case, a memory disposed in the CPU 10 may store a table which correlates types of images and correction image-correction methods which are suitable to these types, for example. Referring to such a table, the CPU 10 determines the image-correction method for the designated area, depending on the type of the image which is designated by the operator.

Figure 4:
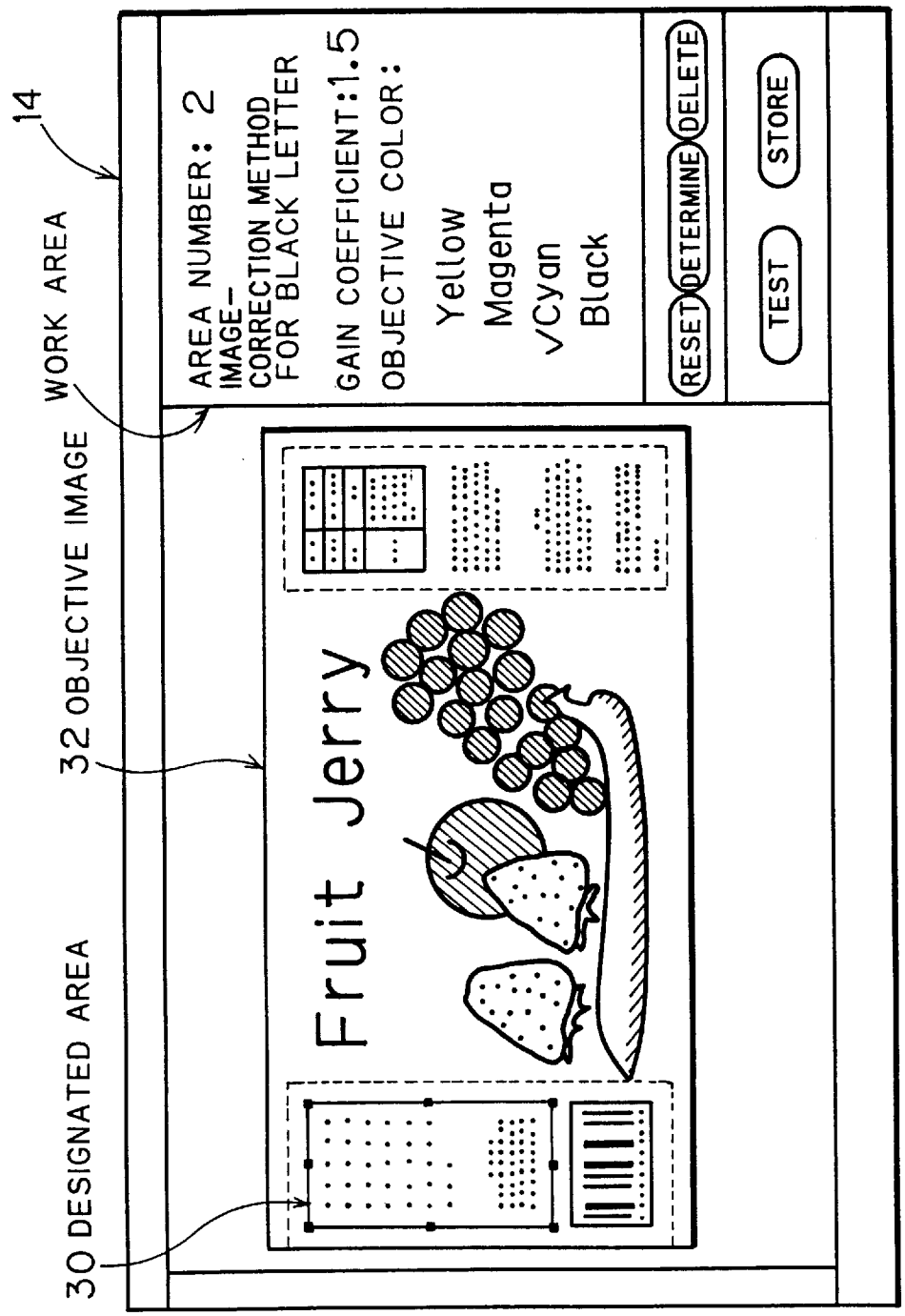
FIG. 4 is a view showing an example of a displayed image on a color monitor in the first preferred embodiment.

FIG. 4 shows an example of a displayed screen on the color monitor 14 after Step S14 and Step S16 described above are executed. In this embodiment, the color monitor 14 is structured to display an objective image 32 and items which are necessary to operate the mouse 18, etc. The example illustrated in FIG. 4 shows that an area 30 corresponding to a black letter in a white background in the objective image 32 is designated as the designated area, an area number of the designated area 30 is "2," the "for-black-letters" method is designated as the image-correction method, the correction gain coefficient which indicates the degree of correction is 1.5, and that the color to be corrected is C (cyan).

If there is still an area to be corrected except for the already designated area after Step S16, the procedure returns to Step S14 again, so that the operator designates the other area to be corrected. At the subsequent Step S16, the operator designates the image-correction method and the correction parameters for the designated area. In a similar manner, the loop proceeding as Step S18→Step S14→Step S16→Step S18 is executed as far as there remains an area to be corrected in the objective image. When designation of all areas to be corrected is complete, the procedure proceeds to Step S20.

At Step S20, the image of the designated area is corrected, by the image-correction method and using the correction parameters which are designated for the designated area. In the present embodiment, in accordance with the sequence which is shown in the flow chart in FIG. 3, the image-correction procedure part 12 performs correction under the control of the CPU 10. More precisely, first at Step S30, the image-correction procedure part 12 retrieves area information regarding the designated area (e.g., a coordinate value of the lower left apex and a coordinate value of the upper right apex of a rectangle which defines the designated area), information for recognizing the image-correction method for the designated area, and the correction parameters. Next at Step S32, of the image data expressing the color which is designated by the correction parameters, image data which correspond to the designated area are read from the image memory 22, in accordance with the area information. Following this, Step S34 to Step S40 are executed to judge which one of the four types of the correction image-correction methods, i.e., one for a photograph, one for a black letter, one for a white letter and one for a thin line, the image-correction method expressed by the recognition information is. At Step S44 to Step S50, the image data read from the image memory 22 are corrected by an image-correction procedure which is based on the image-correction method which is selected in accordance with a result of the judgement. At this stage, the correction parameters such as the correction gain coefficient are used.

After either one of Step S44 to Step S50 is executed depending on the designated image-correction method, the procedure proceeds to Step S42, whereby the image data corresponding to the designated as they are after corrected are written in the image memory 22 at the area in which the image data were originally stored. This completes a correction procedure on one of the designated areas in the objective image.

The process at Step S20 described above with reference to FIG. 2 (i.e., the process shown in the flow chart in FIG. 3) is executed on all the designated areas which are designated at Step S14. That is, as far as there remains a designated area yet to be corrected, a loop proceeding as Step S22→Step S20→Step S22 is repeatedly executed. When correction of all designated areas is complete, the procedure proceeds to Step S24. At this stage, the image memory 22 stores the image data as they are after corrected (i.e., corrected image data). At Step S24, the CPU 10 transfers the corrected image data to the outputting device 26, so that an image which is expressed by the corrected image data is outputted. The CPU 10 also transfers the corrected image data to the magnetic disk device 28 and stores the corrected image data in the magnetic disk device 28, in response to an instruction given using the key board 16 and the mouse 18.

Specific Example of Image-Correction Method

In the following, a description will be given on specific examples of four types of correction image-correction methods which are prepared in the present embodiment.

(1) Image-Correction Method for Photographic Image

Noting pixels of a designated area successively, this image-correction method adds a value, which is obtained by multiplying a correction gain coefficient k by a difference between the density value of the noted pixel and an average value E of the densities of pixels of a predetermined group surrounding the noted pixel, to the density value of the noted pixel. A resultant value obtained by addition is then determined as a post-correction density value of the noted pixel. In such an image-correction method, it is possible to perform correction such as edge enhancement and smoothing, without destroying the balance with the surrounding pixels.

Figure 5A:
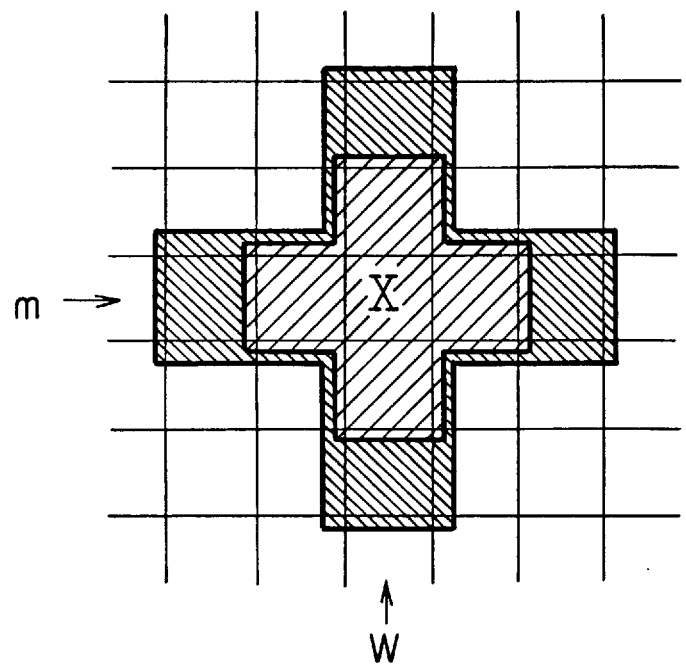
FIGS. 5A and 5B are views describing specific examples of image-correction methods which are prepared in the first preferred embodiment.

For instance, when a pixel X which is a m-th pixel in a w-th line is noted as shown in Fig. 5A, in this image-correction method, the density value of the noted pixel X is calculated at the following steps i) to iii), using the density values of nine pixels which are shadowed with slash lines.

i) A difference the noted pixel X has in a vertical direction is compared with a difference the noted pixel X has in a horizontal direction. The difference in the vertical direction is calculated by:

$$|V_{(w,m-1)} - V_{(w,m)}| + |V_{(w,m+1)} - V_{(w,m)}| \quad (3)$$

The difference in the horizontal direction is calculated by:

$$|V_{(w-1,m)} - V_{(w,m)}| + |V_{(w+1,m)} - V_{(w,m)}| \quad (4)$$

The symbol $V_{(i,j)}$ expresses the density value of a j-th pixel in an i-th line. (Other density values are expressed in a similar manner.)

ii) Based on a result of the comparison, the average value E of the densities of the five pixels which surround the noted pixel X in the direction along which the difference value is larger is calculated. That is, if the difference in the vertical direction is larger, the average value E is calculated by:

$$E = \{V_{(w,m-2)} + V_{(w,m-1)} + V_{(w,m)} + V_{(w,m+1)} + V_{(w,m+2)}\}/5 \quad (5)$$

If the difference in the horizontal direction is larger, the average value E is calculated by:

$$E = \{V_{(w-2,m)} + V_{(w-1,m)} + V_{(w,m)} + V_{(w+1,m)} + V_{(w+2,m)}\}/5 \quad (6)$$

iii) Using the average value E which is calculated in this manner and the correction gain coefficient k which is obtained at Step S30, the density value $V_{n(w,m)}$ of the noted pixel X after corrected is calculated by:

$$V_{n(w,m)} = V_{(w,m)} + k \times \{V_{(w,m)} - E\} \quad (7)$$

If k>0 in the equation above, this image-correction method serves as processing of edge enhancement. If k<0, this image-correction method serves as processing of smoothing.

(2) Image-Correction Method for Black Images in White Backgrounds

Noting pixels of a designated area successively, this image-correction method adds a value, which is obtained by multiplying a correction gain coefficient k by a difference between the density value of the noted pixel and the smallest density value Min among pixels of a predetermined group surrounding the noted pixel, to the density value of the noted pixel. A resultant value obtained by addition is then determined as a post-correction density value of the noted pixel. In such an image-correction method, it is possible to enhance a black portion of a letter.

Figure 5B:
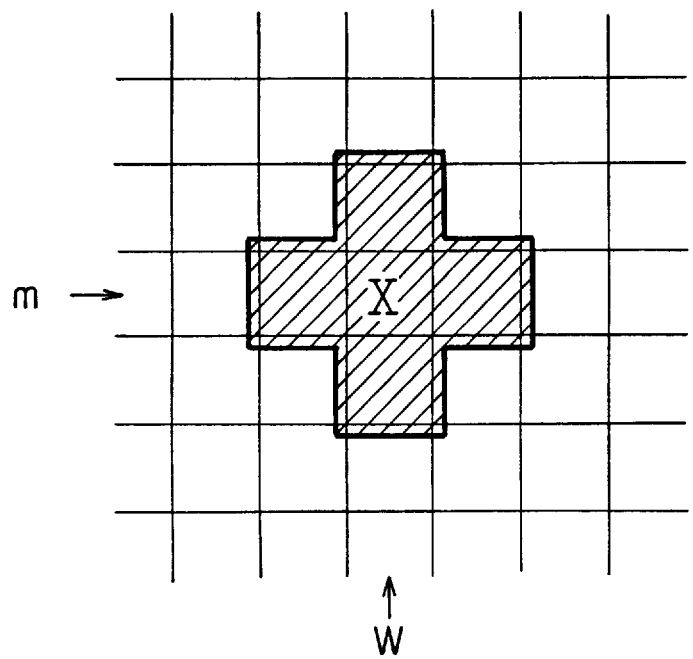

For example, when a pixel X which is an m-th pixel in a w-th line is noted as shown in FIG. 5B, in this image-correction method, the density value of the noted pixel X is calculated at the following steps i) to iii), using density values of five pixels which are shadowed with slash lines.

i) As in the image-correction method above for correcting a photographic image, a difference the noted pixel X has in the vertical direction is compared with a difference the noted pixel X has in the horizontal direction, based on Eq. (3) and Eq. (4) above.

ii) Based on a result of the comparison, the minimum value Min among density values of three pixels which surround the noted pixel X in the direction along which the difference value is larger is calculated. That is, if the difference in the vertical direction is larger, the smallest one of three density values $V_{(w, m-1)}$, $V_{(w, m)}$ and $V_{(w, m+1)}$ is determined as the value Min. If the difference in the horizontal direction is larger, smallest one of three density values $V_{(w-1, m)}$, $V_{(w, m)}$ and $V_{(w+1, m)}$ is determined as the value Min.

iii) Using the minimum value Min which is calculated in this manner and the correction gain coefficient k which is obtained at Step S30, the density value $V_{n(w, m)}$ of the noted pixel X after corrected is calculated by:

$$V_{n(w,m)} = V_{(w,m)} + k \times \{V_{(w,m)} - Min\} \qquad (8)$$

This image-correction method is a image-correction method which is suitable to black images in white backgrounds. A value k>0 is designated as the correction gain coefficient k, and edge enhancement which enhances a black portion of a letter is performed in accordance with this value.

(3) Image-Correction Method for White Images in Black Backgrounds

Noting pixels of a designated area successively, this image-correction method subtracts a value, which is obtained by multiplying a correction gain coefficient k by a difference between the density value of the noted pixel and the largest density value Max among pixels of a predetermined group surrounding the noted pixel, from the density value of the noted pixel. A resultant value obtained by subtraction is then determined as a post-correction density value of the noted pixel. In such an image-correction method, it is possible to enhance a white portion defining a letter.

For example, similar to the above, when a pixel X which is an m-th pixel in a w-th line is noted as shown in FIG. 5B, in this image-correction method, the density value of the noted pixel X is calculated at the following steps i) to iii), using density values of five pixels which are shadowed with slash lines.

i) As in the image-correction method above for correcting a photographic image and the image-correction method above for correcting black images in white backgrounds, a difference the noted pixel X has in the vertical direction is compared with a difference the noted pixel X has in the horizontal direction, based on Eq. (3) and Eq. (4) above.

ii) Based on a result of the comparison, the maximum value Max among density values of three pixels which surround the noted pixel X in the direction along which the difference value is larger is calculated. That is, if the difference in the vertical direction is larger, the largest one of three density values $V_{(w, m-1)}$, $V_{(w+1, m)}$ and $V_{(w, m+1)}$ is determined as the value Max. If the difference in the horizontal direction is larger, largest one of three density values $V_{(w-1, m)}$, $V_{(w, m)}$ and $V_{(w+1, m)}$ is determined as the value Max.

iii) Using the maximum value Max which is calculated in this manner and the correction gain coefficient k which is obtained at Step S30, the density value $V_{n(w, m)}$ of the noted pixel X after corrected is calculated by:

$$V_{n(w,m)} V_{(w,m)} - k \times \{Max - V_{(w,m)}\} \qquad (9)$$

This image-correction method is a image-correction method which is suitable to white images in black backgrounds. A value k>0 is designated as the correction gain coefficient k, and edge enhancement which enhances a white portion of a letter is performed in accordance with this value.

(4) Image-Correction Method for Thin Line Image

Noting pixels of a designated area successively, this image-correction method performs the following processing. That is, when the density value of the noted pixel is the smallest among the density values of the pixels which belong to a predetermined group surrounding the noted pixel, this image-correction method subtracts a value, which is obtained by multiplying the correction gain coefficient k by a difference between the density value of the noted pixel and the largest density value among the density values of the pixels which belong to the predetermined group, from the density value of the noted pixel. A resultant value obtained by subtraction is then determined as a post-correction density value of the noted pixel. Conversely, when the density value of the noted pixel is the largest among the density values of the pixels which belong to the predetermined group surrounding the noted pixel, this image-correction method adds a value, which is obtained by multiplying the correction gain coefficient k by a difference between the density value of the noted pixel and the smallest density value among the pixels of the predetermined group, to the density value of the noted pixel. A resultant value obtained by addition is then determined as a post-correction density value of the noted pixel. In such an image-correction method, it is possible to enhance the center of a thin line, that is, a core of the thin line.

For example, assuming that a pixel X which is an m-th pixel on a w-th line is noted as shown in FIG. 5B, in this image-correction method, the density value of the noted pixel X is calculated at the following steps i) to iii), using density values of five pixels which are shadowed with slash lines.

i) Whether the density of the noted pixel X is largest or smallest among three surrounding pixels in the vertical direction and in the horizontal direction is judged.

ii) Based on a result of the judgement, the situation is classified as described below. In the following, a condition in which the density of the noted pixel X is not largest nor smallest is expressed as "mid-tone."

a) A case where the density of the noted pixel X is largest in the vertical direction and in the horizontal direction;

b) A case where the density of the noted pixel X is largest in the vertical direction but is smallest in the horizontal direction;

c) A case where the density of the noted pixel X is largest in the vertical direction but is a mid-tone density in the horizontal direction;

d) A case where the density of the noted pixel X is smallest in the vertical direction but is largest in the horizontal direction;

e) A case where the density of the noted pixel X is smallest in the vertical direction and in the horizontal direction;

f) A case where the density of the noted pixel X is smallest in the vertical direction but is a mid-tone density in the horizontal direction;

g) A case where the density of the noted pixel X is a mid-tone density in the vertical direction but is largest in the horizontal direction;

h) A case where the density of the noted pixel X is a mid-tone density in the vertical direction but is smallest in the horizontal direction; and j) A case where the density of the noted pixel X is a mid-tone density in the vertical direction and in the horizontal direction.

iii) The density of the noted pixel X is calculated as follows, depending on which one of the cases above applies.

In the cases a), b), d) and e), while it is judged that there is a thin line around the noted pixel X, it is not possible to determine the direction of the thin line. Hence, the direction of the thin line is judged by the image-correction method for correcting a photographic image described above. More precisely, which one of the difference value in the vertical direction regarding the noted pixel X and the difference value in the horizontal direction regarding the noted pixel X is larger is determined from Eqs. (3) and (4), and based on a result of the judgement, the following is performed.

When the case a) applies, an image surrounding the noted pixel X is determined a horizontal rule if the difference value in the vertical direction is larger but is a vertical rule if the difference value in the horizontal direction is larger. It is determined that the noted pixel X is a pixel on the core of the straight line.

When the case b) applies, an image surrounding the noted pixel X is determined a horizontal rule if the difference value in the vertical direction is larger but is a white vertical rule in a black background if the difference value in the horizontal direction is larger. It is determined that the noted pixel X is a pixel on the core of the straight line.

When the case d) applies, an image surrounding the noted pixel X is determined a white horizontal rule in a black background if the difference value in the vertical direction is larger but is a vertical rule if the difference value in the horizontal direction is larger. It is determined that the noted pixel X is a pixel on the core of the straight line.

When the case e) applies, an image surrounding the noted pixel X is determined a white horizontal rule in a black background if the difference value in the vertical direction is larger but is a white vertical rule in a black background if the difference value in the horizontal direction is larger. It is determined that the noted pixel X is a pixel on the core of the straight line.

Next, the processing of the case c) as below is executed when it is determined that the image surrounding the noted pixel X is a horizontal rule, the processing of the case f) as below is executed when it is determined that the image surrounding the noted pixel X is a white horizontal rule in a black background, the processing of the case g) as below is executed when it is determined that the image surrounding the noted pixel X is a straight vertical line, and the processing of the case h) as below is executed when it is determined that the image surrounding the noted pixel X is a white vertical line against a black background, whereby the post-correction density value $V_{n(w, m)}$ of the noted pixel X is calculated.

In the case c), it is determined that the image surrounding the noted pixel X is a horizontal rule and the noted pixel X is a pixel on the core of this straight line. In this case, the minimum value Min of the density values $V_{(w, m-1)}$, $V_{(w, m)}$ and $V_{(w, m+1)}$ of the three surrounding pixels in the vertical direction is calculated. Using the minimum value Min and the correction gain coefficient k which is obtained at Step S30, the post-correction density value $V_{n(w, m)}$ of the noted pixel X is calculated by the equation below:

$$V_{n(w,m)} = V_{(w,m)} + k \times \{V_{(w,m)} - Min\} \qquad (10)$$

According to such an image-correction procedure, a value k>0 is designated as the correction gain coefficient k, and therefore, it is possible to enhance the core of the thin line, i.e., a horizontal rule, in accordance with this value.

In the case f), it is determined that the image surrounding the noted pixel X is a white horizontal rule in a black background and the noted pixel X is a pixel on the core of this straight line. In this case, the maximum value Max of the density values $V_{(w, m-1)}$, $V_{(w, m)}$ and $V_{(w, m+1)}$ of the three surrounding pixels in the vertical direction is calculated. Using the maximum value Max and the correction gain coefficient k which is obtained at Step S30, the post-correction density value $V_{n(w,m)}$ of the noted pixel X is calculated by the equation below:

$$V_{n(w,m)} = V_{(w,m)} - k \times \{Max - V_{(w,m)}\} \qquad (11)$$

According to such an image-correction procedure, a value k>0 is designated as the correction gain coefficient k, and therefore, it is possible to enhance the core of the thin line, i.e., a white horizontal rule in a black background, in accordance with this value.

In the case g), it is determined that the image surrounding the noted pixel X is a straight vertical line and the noted pixel X is a pixel on the core of this straight line. In this case, the minimum value Min of the density values $V_{(w-1, m)}$, $V_{(w, m)}$ and $V_{(w+1, m)}$ of the three surrounding pixels in the horizontal direction is calculated. Using the minimum value Min and the correction gain coefficient k which is obtained at Step S30, the post-correction density value $V_{n(w, m)}$ of the noted pixel X is calculated by the equation (10), as in the case of correcting a horizontal rule described above. According to such an image-correction procedure, a value k>0 is designated as the correction gain coefficient k, and therefore, it is possible to enhance the core of the thin line, i.e., a straight vertical line, in accordance with this value.

In the case h), it is determined that the image surrounding the noted pixel X is a white straight vertical line against a black background and the noted pixel X is a pixel on the core of this straight line. In this case, the maximum value Max of the density values $V_{(w-1, m)}$, $V_{(w, m)}$ and $V_{(w+1, m)}$ of the three surrounding pixels in the horizontal direction is calculated. Using the maximum value Max and the correction gain coefficient k which is obtained at Step S30, the post-correction density value $V_{n(w, m)}$ of the noted pixel X is calculated by the equation (11), as in the case of correcting a white horizontal rule in a black background described above. According to such an image-correction procedure, a value k>0 is designated as the correction gain coefficient k, and therefore, it is possible to enhance the core of the thin line, i.e., a white straight vertical line against a black background, in accordance with this value.

In the case j), it is determined that the image surrounding the noted pixel X is a tint image. Hence, the density value of the noted pixel X is not changed.

Figure 3:
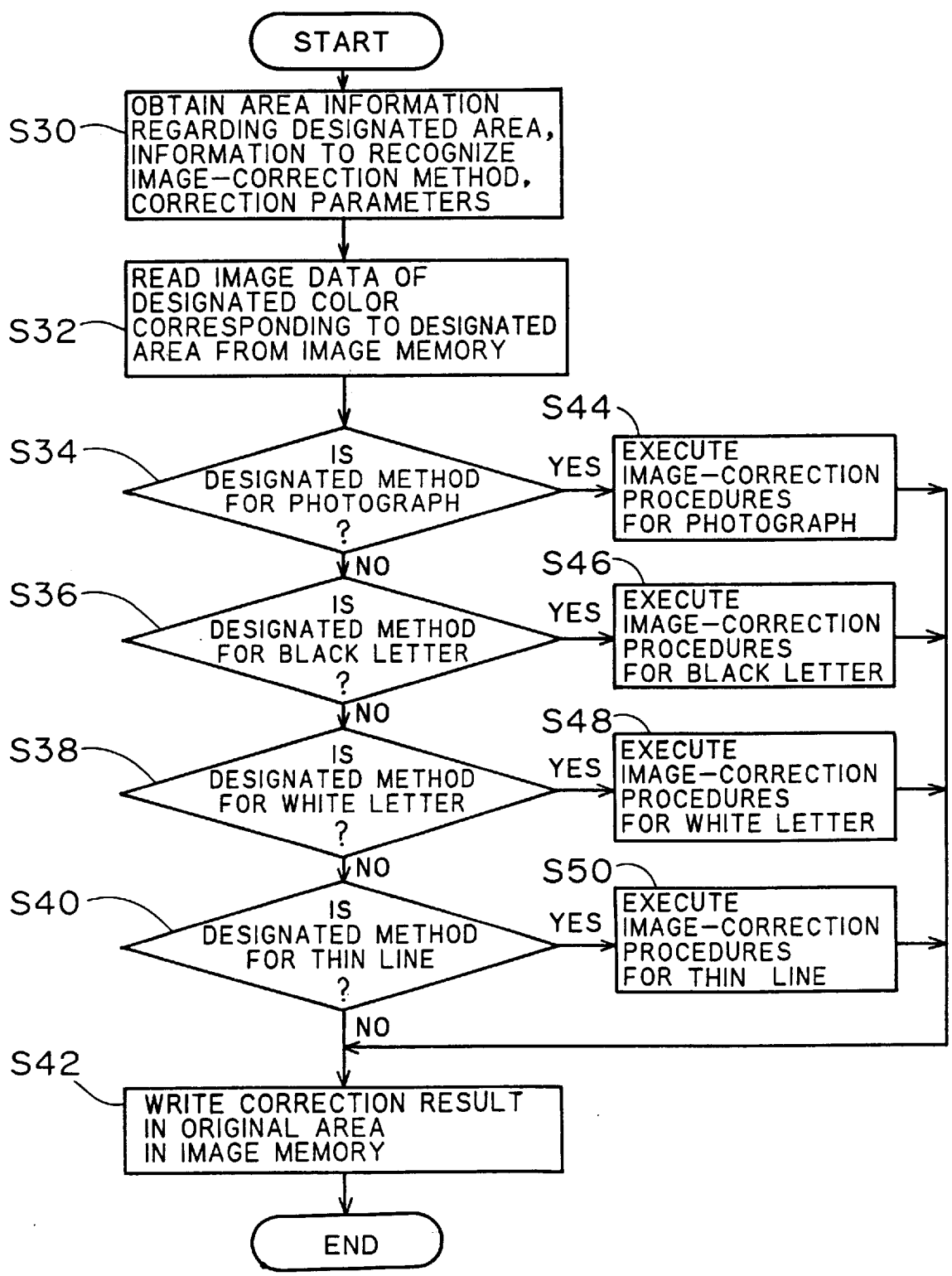
FIG. 3 is a flow chart showing procedures which are performed on the image of a designated area in image-correction according to the first preferred embodiment.

As described above, in the present embodiment, an operator designates an area yet to be corrected within an objective image, depending on the type of the image, so that image data which correspond to the designated area are corrected by an image-correction procedure which is suitable to the type of the image of the designated area (See FIG. 3). More specifically, to realize an image-correction procedure which is suitable to the type of the image, the image-correction method memory 24 stores the image-correction method for correcting photograph images, the image-correction method for correcting black images in white backgrounds, the image-correction method for correcting white images in black backgrounds, and the image-correction method for correcting thin line images described above in (1) through (3), etc., for example, as a program which is to be executed by the image-correction procedure part 12. As can be understood from the description from (1) to (4), these correction image-correction methods sufficiently improve the quality of a corresponding image. For example, when the objective image of FIG. 11A as described earlier, i.e., an image in which black images in white backgrounds and white images in black backgrounds are present together, is to be corrected, a density distribution of a first pixel group, which consists of 3×3 pixels which are present within the circle of the dotted line within the area of the black image in the white background, and a density distribution of a second pixel group, which consists of 3×3 pixels which are present within the circle of the dotted line within the area of the white image in the black background, both look like the distribution shown in FIG. 11B. However, if an upper half region, i.e., the area of the black image in the white background and a lower half region, i.e., the area of the white image in the black background are designated separately from each other, and the image-correction method for correcting black images in white backgrounds is selected for the designated upper half region while selecting the image-correction method for correcting white images in black backgrounds for the designated lower half region (See Step S14 and Step S16 in FIG. 2), the density distribution of the first pixel group becomes as shown in FIG. 11D while the density distribution of the second pixel group becomes as shown in Fig. 11E. This means that correction which is suitable to the type of the image is performed each in the upper half region and the lower half region and that the image quality is improved in the both regions.

Thus, according to the present embodiment, even if various types of images, such as photograph images and black images in white backgrounds, exist together in an objective image, it is possible to sufficiently improve the quality of the image at all areas which are to be corrected.

Now, a description will be given on an image-correction apparatus according to other preferred embodiment (hereinafter "second preferred embodiment") of the present invention. Although the image-correction apparatus according the second preferred embodiment has the same hardware structure as that of the image-correction apparatus according the first preferred embodiment described above (See FIG. 1), the sequence of correcting an image is different from that used in the first preferred embodiment described. In other words, while the first preferred embodiment requires an operator to select the image-correction method to be used to correct an image of each designated area (Step S16 in FIG. 2) based on the operator's judgement, in this embodiment, the CPU 10 automatically judges the type of the image of each designated area and select the image-correction method which is suitable to the type of the image of each designated area based on a result of the judgement.

Figure 6:
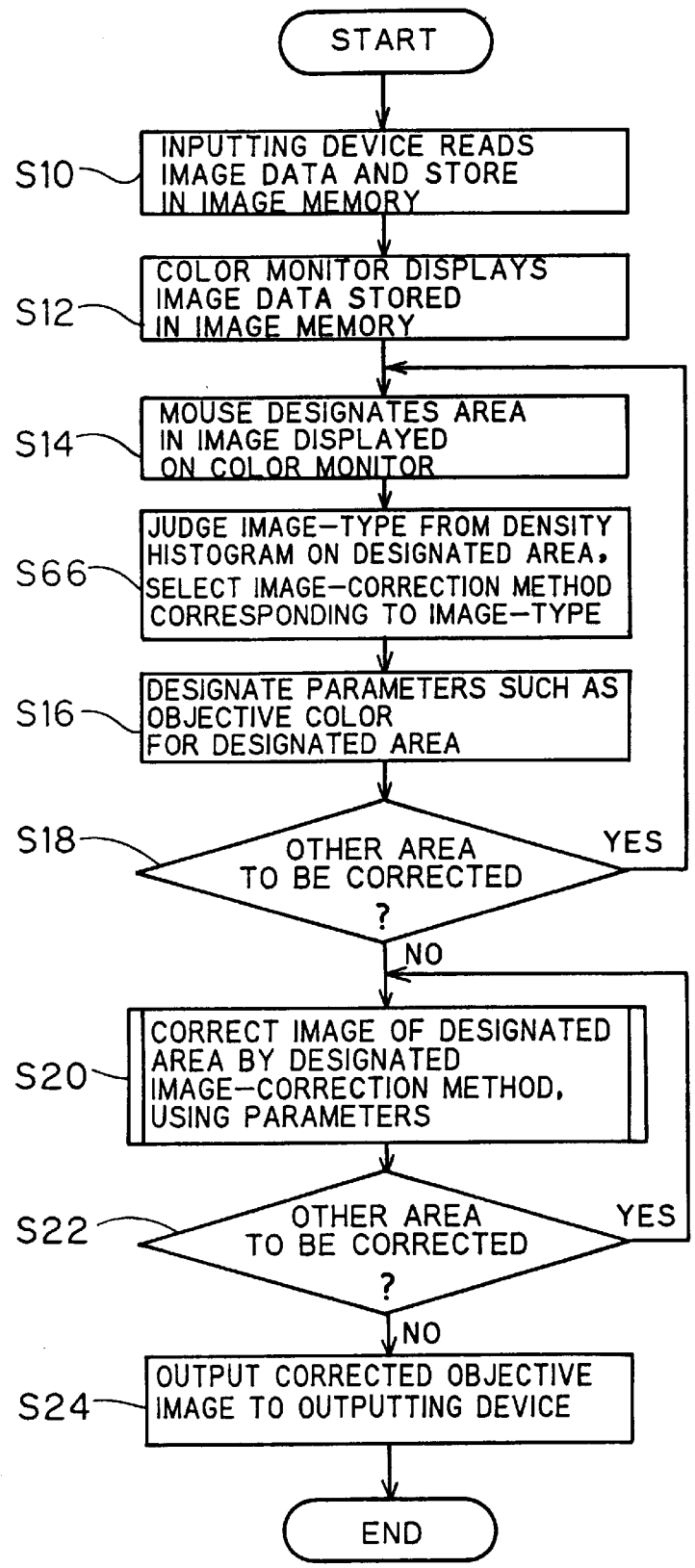
FIG. 6 is a flow chart showing a sequence of image-correction according to another preferred embodiment of the present invention (second preferred embodiment)
Figure 7:
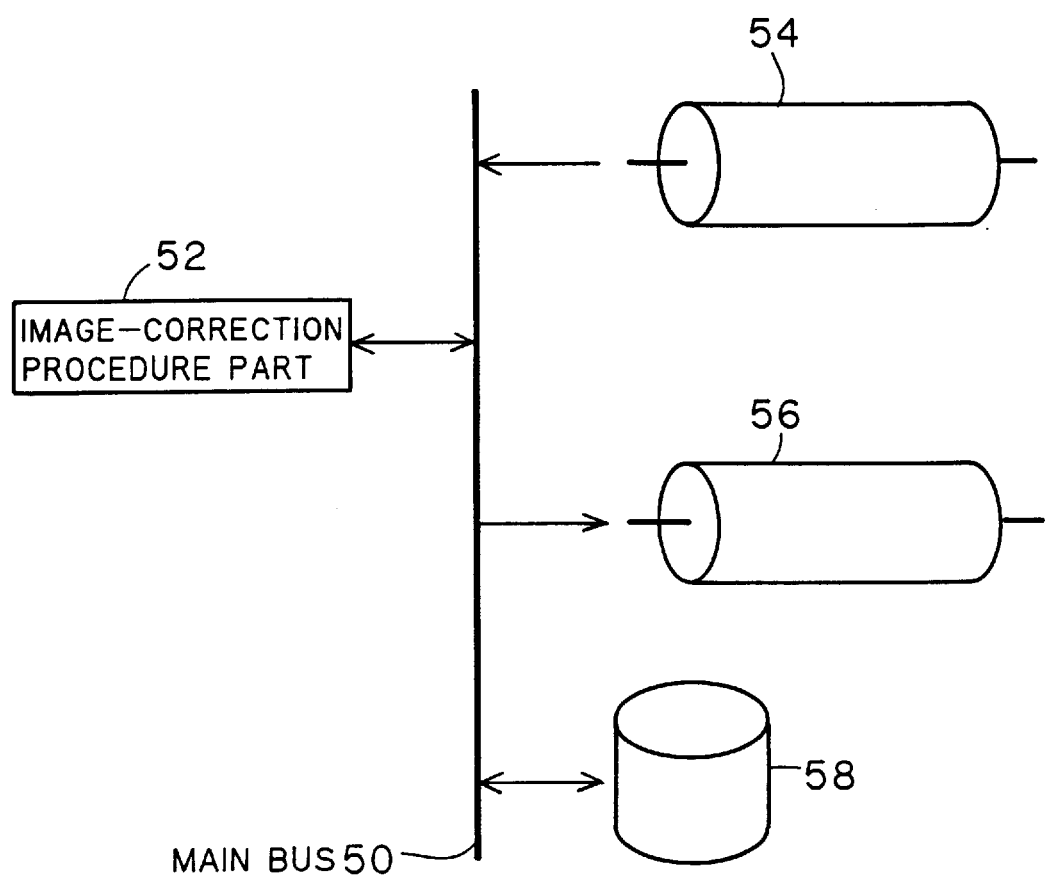
FIG. 7 is a structure diagram showing an example (first preferred embodiment) of a conventional image-correction apparatus.
Figure 8:
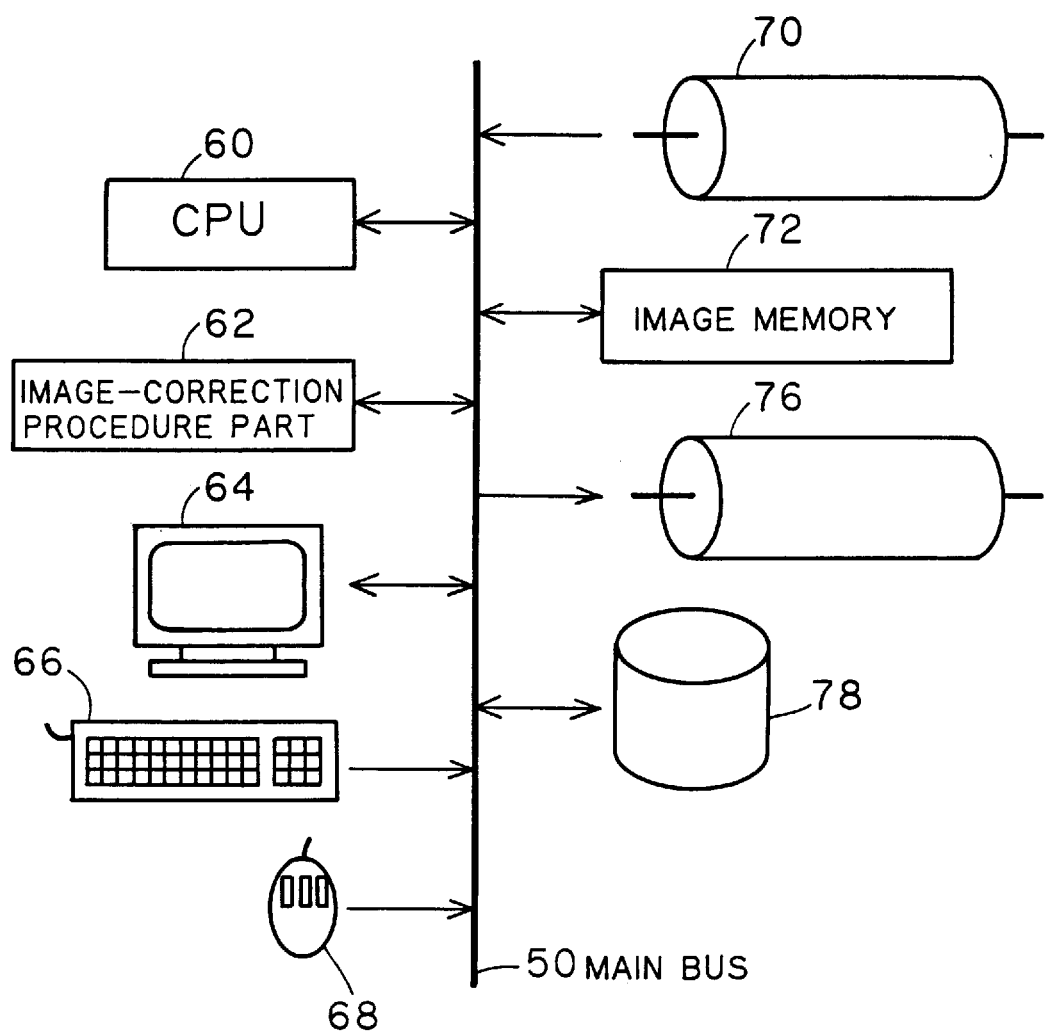
FIG. 8 is a structure diagram showing another example (second preferred embodiment) of a conventional image-correction apparatus.
Figure 9:
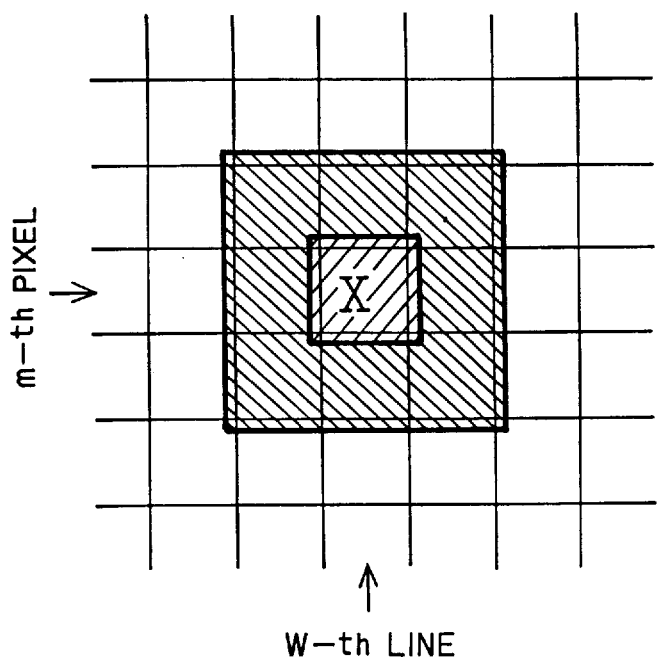
FIGS. 9 and 10 are views describing conventional image-correction methods.
Figure 10:
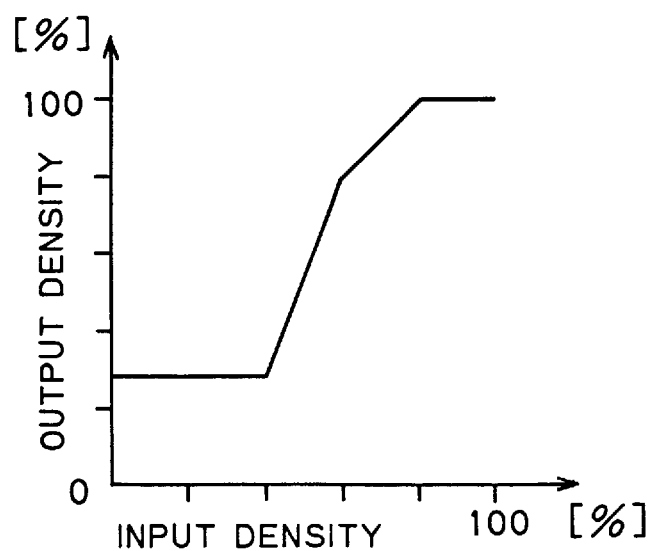

FIG. 6 is a flow chart showing a sequence of image-correction in the present embodiment. As in the image-correction according to the first preferred embodiment, first, the CPU 10 causes the inputting device 20 to read an objective image and store resultant image data to the image memory 22, and instructs the color monitor 14 to display the objective image, using the image data which are stored (Step S10, Step S12). An operator then successively designates areas to be corrected within the objective image using the mouse 18, while observing the screen display on the color monitor 14 (Step S14, Step S18).

Unlike in the first preferred embodiment, every time an area to be corrected is designated, the CPU 10 generates a density histogram at Step S66, using image data which correspond to the designated area. The type of the image of the designated area is judged based on the density histogram, and based on a result of the judgement, the image-correction method which is suitable to the type of the image is selected. Three types of correction image-correction methods, i.e., one for correcting photograph images, one for correcting black images in white backgrounds, and the other for correcting white images in black backgrounds, are prepared in advance in the second preferred embodiment. The CPU 10 selects the image-correction method which is suitable to the type of the image of the designated area, among these three types of correction image-correction methods.

Figure 12A:
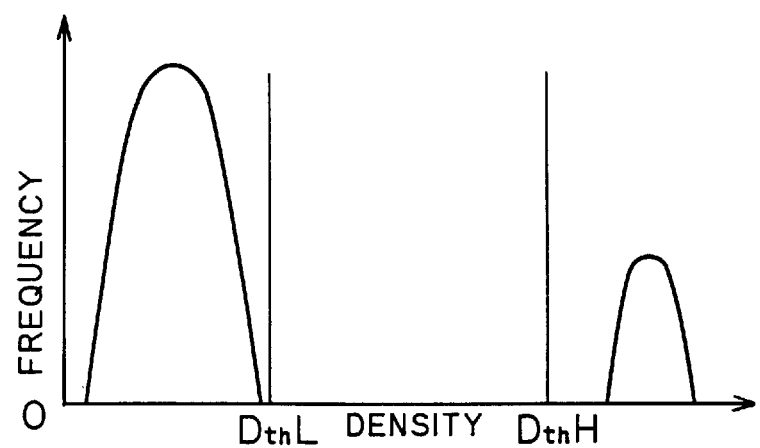
FIGS. 12A to 12C are views showing density histograms on which black images in white backgrounds, white images in black backgrounds, and a photographic image.
Figure 12B:
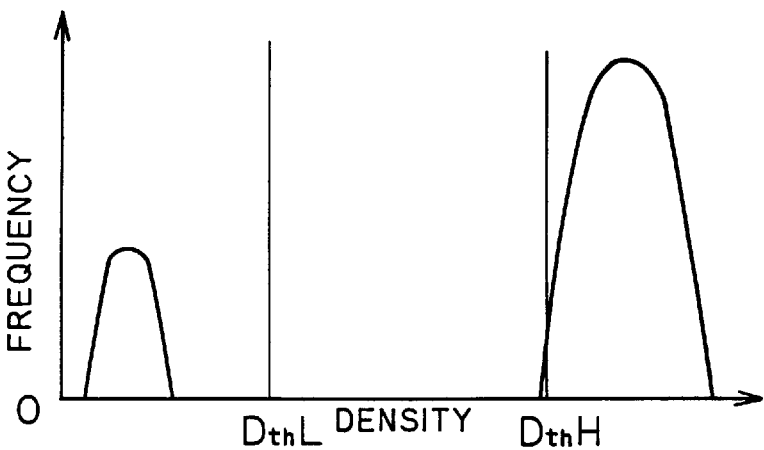
Figure 12C:
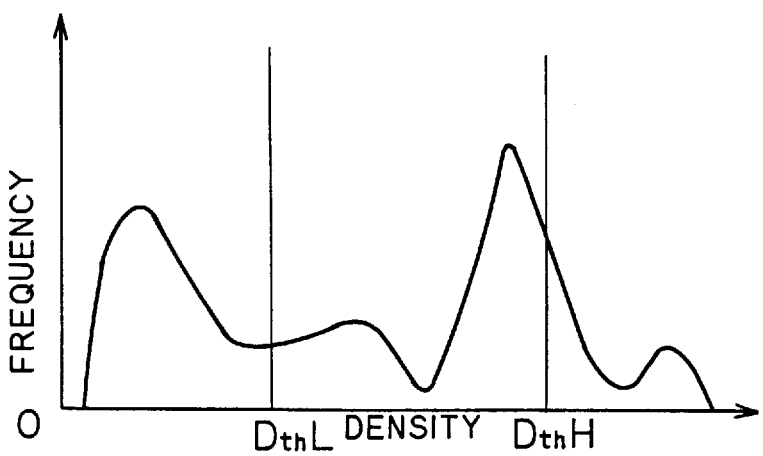

During such processing at Step S66, judgement of the type of the image based on the density histogram is executed as follows. As shown in FIG. 12A, a low density peak which corresponds to a white background and a high density peak which corresponds to a black letter portion appear in the density histogram expressing a black image in a white background, and the low density peak is higher than the high density peak. As shown in FIG. 12B, a low density peak which corresponds to a white letter portion and a high density peak which corresponds to a black background appear in the density histogram expressing a white image in a black background, and the high density peak is higher than the low density peak. On the other hand, as shown in FIG. 12C, not only a low density peak and a high density peak appear in the density histogram expressing a photograph image, but rather, a peak corresponding to an mid-tone density sometimes appears. The frequency of mid-tone densities is higher in a photograph image than in a black image in a white background and a white image in a black background. Hence, whether the image is a photograph image is determined based on the frequency of mid-tone densities. If the image is not a photograph image, which one of the low density peak and the high density peak is higher is examined, whereby whether the image is a black image in a white background or a white image in a black background is judged. That is, a first density threshold value DthL and a second density threshold value $D_{thH}$ ($D_{TtHL} < D_{thH}$) for the density histogram are determined in advance. An accumulated frequency threshold value Nth is also determined in advance.

Frequencies having smaller densities than the first density threshold value $D_{thL}$ in the density histogram are counted, thereby obtaining a first accumulated frequency value $N_{thL}$. Frequencies having densities which are larger than the first density threshold value $D_{thL}$ but smaller than a second density threshold value $D_{thH}$ in the density histogram are counted, thereby obtaining a second accumulated frequency value $N_{thM}$. Further, frequencies having larger densities than the second density threshold value $D_{thH}$ in the density histogram are counted, thereby obtaining a third accumulated frequency value $N_{thH}$.

The second accumulated frequency value $N_{thM}$ and the accumulated frequency threshold value $N_{th}$ are compared with each other. If the second accumulated frequency value $N_{thM}$ is larger than the accumulated frequency threshold value $N_{th}$, it is determined that the image is a photographic image. If the second accumulated frequency value $N_{thm}$ is smaller than the accumulated frequency threshold value $N_{th}$, the first accumulated frequency value $N_{thL}$ is compared with the third accumulated frequency value $N_{thH}$. If the first accumulated frequency value $N_{thL}$ is larger than the third accumulated frequency value $N_{thH}$, it is determined that the objective image is a black image in a white background. If the first accumulated frequency value $N_{thL}$ is smaller than the third accumulated frequency value $N_{thH}$, it is determined that the objective image is a white image in a black background. Thus, based on the density histogram, it is possible to judge which one of the three types of images, i.e., a photographic image, a black image in a white background, and a white image in a black background, the objective image is.

After the image-correction method is selected at Step S66, at the next Step S16, the operator designates the correction parameters, such as a color to be corrected within the designated area and the correction gain coefficient, using the key board 16 and the mouse 18. This is the same as in the first preferred embodiment described above.

When there is an area to be corrected in addition to the current designated area after executing Step S66, the operator returns to Step S14 to designate other areas to be designated. When there is not area to be corrected left, the operator proceeds to Step S20. The subsequent processing is the same as in the first preferred embodiment described above.

As described above, according to the second preferred embodiment, only if an operator designate an area to be corrected within an objective image in accordance with the type of the image, the image-correction method which is suitable to the type of the image of the designated area is automatically selected, so as to correct image data which correspond to the designated area, and the image of the designated area is corrected by the selected image-correction method. Hence, the operability of the image-correction apparatus is better than in the first preferred embodiment.

While the foregoing has described that image data for Y, M, C and K are generated, data for three colors or R (red), G (green) and B (blue) may be generated instead.

While the invention has been described in detail, the foregoing description is in all aspects illustrative and not restrictive. It is understood that numerous other modifications and variations can be devised without departing from the scope of the invention.

I claim:

1. An apparatus for correcting an objective image, comprising:
    a) memory means for storing a plurality of image-correction procedures;
    b) display means for displaying said objective image;
    c) designation means for designating a part of said objective image on said display means to determine a partial image;
    d) first automatic means for automatically determining an image-type of said partial image from a density distribution on said partial image, said first automatic means including:
        d-1) histogram means for detecting a density histogram on said partial image, to thereby determine said density distribution, said histogram means including:
            d-1-1) peak-detector means for detecting peaks of said density histograms, and
            d-1-2) peak-comparator means for comparing said peaks with each other to determine said image-type of said partial image;
    e) second automatic means for automatically determining one of said plurality of image-correction procedures according to said image-type of said partial image; and
    f) correction means for correcting said partial image in accordance with said selected image-correction procedure.

2. The apparatus of claim 1, wherein said plurality of image-correction procedures includes:
    a first image-correction procedure adapted to correct images of a first type corresponding to a photograph image,
    a second image-correction procedure adapted to correct images of a second type which are a black image in a white background, and
    a third image-correction procedure adapted to correct images of a third type which are a white image in a black background.

3. The apparatus of claim 2, wherein said peak-detector means includes:
    means for detecting a first peak at a relatively-higher density region,
    means for detecting a second peak at a relatively-lower density region, and
    means for detecting a third peak at a medium density region;
    said peak-comparator means including:
        means for comparing said third peak with a predetermined value; and
        means for comparing said first peak with said second peak, and
    said first automatic means further including:
        means for determining said first type as said image-type when said third peak is higher than said predetermined value;
        means for determining said second type as said image-type when said third peak is lower than said predetermined value and said second peak is higher than said first peak; and
        means for determining said third type as said image-type when said third peak is lower than said predetermined value said second peak is lower than said first peak.

4. A method of correcting an objective image, comprising the steps of:
    a) determining a plurality of image-correction procedures;
    b) displaying said objective image;
    c) designating a part of said objective image displayed, to determine a partial image;
    d) determining said image-type of said partial image from a density distribution on said partial image, said step d) including a step of:
        d-1) detecting a density histogram on said partial image to thereby determine said density distribution said step d-1) including steps of:
            d-1-1) detecting peaks of said density histogram, and
            d-1-2) comparing said peaks with each other to determine said image-type of said partial image;
    e) determining said one of said plurality of image-correction procedures according to said image-type of said partial image; and
    f) correcting said partial image in accordance with said selected image-correction procedure.

5. The apparatus of claim 4, wherein said plurality of image-correction procedures includes
    a first image-correction procedure adapted to correct images of a first type corresponding to a photograph image, a second image-correction procedure adapted to correct images of a second type which are a black image in a white background, and a third image-correction procedure adapted to correct images of a third type which are a white image in a black background.

6. The method of claim 5, wherein said step d-1-1) includes steps of:

detecting a first peak at a relatively-higher density region, detecting a second peak at a relatively-lower density region, and detecting a third peak at a medium density region;

said step d-1-2) including steps of:

comparing said third peak with a predetermined value; and comparing said second peak with said first peak;

said step d) including steps of:

determining said first type as said image-type when said third peak is higher said predetermined value;

determining said second type as said image-type when said third peak is lower than said predetermined value said second peak is higher than said first peak, and determining said third type as said imagetype when said third peak is lower than said predetermined value and said second peak is lower than said first peak.

\* \* \* \* \*